(12) United States Patent
Ernst et al.

(10) Patent No.: US 9,714,005 B2
(45) Date of Patent: Jul. 25, 2017

(54) WIPER ARM WIND DEFLECTOR UNIT

(71) Applicant: Robert Bosch GmbH, Stuttgart (DE)

(72) Inventors: Waldemar Ernst, Vaihingen/Enz (DE); Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/901,169

(22) PCT Filed: Jun. 18, 2014

(86) PCT No.: PCT/EP2014/062793
§ 371 (c)(1),
(2) Date: Dec. 28, 2015

(87) PCT Pub. No.: WO2014/206826
PCT Pub. Date: Dec. 31, 2014

(65) Prior Publication Data
US 2016/0144827 A1    May 26, 2016

(30) Foreign Application Priority Data

Jun. 26, 2013 (DE) .................. 10 2013 212 195

(51) Int. Cl.
*B60S 1/32* (2006.01)
*B60S 1/52* (2006.01)
*B60S 1/04* (2006.01)
*B60S 1/34* (2006.01)

(52) U.S. Cl.
CPC ............ *B60S 1/0408* (2013.01); *B60S 1/32* (2013.01); *B60S 1/3415* (2013.01); *B60S 1/522* (2013.01)

(58) Field of Classification Search
CPC ........ B60S 1/3806; B60S 1/381; B60S 1/524; B60S 1/522; B60S 1/3415; B60S 1/0408; B60S 1/32
USPC ........................................ 15/250.04, 250.201
See application file for complete search history.

(56) References Cited

U.S. PATENT DOCUMENTS

| 4,782,547 A | 11/1988 | Mohnach |
| 5,430,909 A | 7/1995 | Edele et al. |
| 2008/0201894 A1* | 8/2008 | Ko .................. B60S 1/3858 15/250.201 |

FOREIGN PATENT DOCUMENTS

| DE | 3740639 A1 * | 9/1989 |
| FR | 2603850 A1 * | 3/1988 |
| GB | 1373970 | 11/1974 |

OTHER PUBLICATIONS

International Search Report for Application No. PCT/EP2014/062793 dated Oct. 14, 2014 (English Translation, 2 pages).

* cited by examiner

*Primary Examiner* — Gary Graham
(74) *Attorney, Agent, or Firm* — Michael Best & Friedrich LLP (57) ABSTRACT

The invention proposes a wind deflector unit, more particularly a wiper arm wind deflector unit, having at least one wind deflector element (112a, 112b; 212a, 212b; 312a, 312b), having at least one first coupling unit (114a, 114b; 214a, 214b; 314a, 314b) which in an installed condition is designed to be connected to a wiper stem (116; 216; 316) of a wiper arm (118; 218; 318), and having at least one second coupling unit (120a, 120b; 220a, 220b; 320a, 320b) which in an installed condition is designed to receive a wiper fluid duct (122; 222; 322).

8 Claims, 6 Drawing Sheets

WIPER ARM WIND DEFLECTOR UNIT

BACKGROUND OF THE INVENTION

A wind deflector unit has already been proposed.

SUMMARY OF THE INVENTION

A wind deflector unit, in particular a wiper arm wind deflector unit, is proposed, comprising at least one wind deflector element, comprising at least one first coupling unit which in a mounted state is provided to be connected to a wiper stem of a wiper arm, and comprising at least one second coupling unit which in a mounted state is provided to receive a windshield wiper fluid duct. "Wind deflector element" is intended to be understood, in particular, in this context as a unit which is provided to deflect driving wind acting on the wiper arm device and/or to be used for pressing the wiper arm device against a wiper arm. Preferably, the wind deflector element has at least one concave outer surface. Moreover, "coupling unit" is intended to be understood in this context, in particular, as a unit which is provided for producing a connection, in particular a connection which is releasable without damage. Preferably, a unit is intended to be understood thereby which is provided to connect at least the wiper arm unit by a positive, non-positive and/or material connection to a wiper stem of a wiper arm and/or a windshield wiper fluid duct. Particularly preferably, a unit is intended to be understood thereby which is provided for producing a connection which is releasable without damage, wherein the connection in this case is able to be produced, in particular, without the use of a tool. "Provided" is intended in this context to be understood, in particular, as specifically programmed, designed and/or equipped. By an object being provided for a specific function is intended to be understood, in particular, that the object fulfills and/or performs this specific function in at least one usage state and/or operating state. Moreover, in this context a "wiper stem" is intended to be understood, in particular, as an elongated component of the wiper arm which extends at least substantially parallel to a main direction of extent of the wiper arm. Preferably, in particular, a component is intended to be understood thereby which is provided to connect a drive shaft of the wiper arm indirectly to a receiving region for a wiper blade for transmitting a movement, in particular a rotational movement. Moreover, in this context, a "windshield wiper fluid duct" is intended to be understood, in particular, as a duct which is provided, in particular, to conduct in particular at least in a partial portion windshield wiper fluid during operation of the windshield wiper fluid distribution unit, in particular, from a tank to a wiper nozzle unit. Preferably, intended to be understood thereby is a duct which is provided in at least one partial portion to take windshield wiper fluid to a line and/or delivery unit. Particularly preferably, intended to be understood thereby, in particular, is a duct which is provided in at least one operating mode for directly receiving windshield wiper fluid.

By means of the embodiment according to the invention of the wind deflector unit, in particular inadvertent release of the wind deflector unit from the wiper stem may be prevented. In particular, as a result, an advertent release of the wind deflector unit, for example by driving wind, may be prevented and/or avoided.

It is further proposed that the at least one wind deflector unit is integrally configured with the at least one first coupling unit and/or with the at least one second coupling unit. Preferably the at least one wind deflector element of the at least one first coupling unit and the at least one second coupling unit are formed in one piece. "Integrally" is intended to be understood, in particular, as being at least connected by a material connection, for example by a welding process, an adhesive bonding process, an injection-molding process and/or a further process which appears expedient to the person skilled in the art and/or is intended to be understood as advantageously formed in one piece, such as for example by producing from a casting and/or by producing in a single-component or multi-component injection-molding method and advantageously from a single blank. Preferably, it is intended to be understood thereby, in particular, that it is produced in one piece, particularly preferably produced in a primary shaping process. As a result, an advantageous wind deflector unit may be provided. Preferably, as a result, the number of components may be kept low whereby, in particular, an advantageously simple and rapid mounting may be achieved.

Moreover, it is proposed that the at least one first coupling unit and the at least one second coupling unit comprise at least one clip fastening element. "Clip fastening element" is intended to be understood, in particular, in this context as a fastening element which has at least one latching means. The at least one latching means may in this case be provided both for latching to the fastening element itself and/or to a component to be coupled. In this case "latching means" is intended to be understood, in particular, as a resilient means for producing a latching connection which is provided during mounting to be deflected in a resilient manner. As a result, a wind deflector unit which is particularly easy to mount may be provided. In particular, as a result, a particularly advantageously simple coupling may be achieved. Preferably, the wind deflector unit may be easily clipped by an operator onto the wiper arm. In particular, as a result, a simple and rapid retrofitting of a wind deflector unit onto a wiper arm may be achieved. Moreover, as a result, a windshield wiper fluid duct may be clipped particularly easily onto the wind deflector unit. In particular, as a result, a simple and rapid retrofitting of a windshield wiper fluid duct on a wiper arm may be achieved via the wind deflector unit.

It is further proposed that the at least one first coupling unit or the at least one second coupling unit comprises at least one clip fastening element. As a result, a wind deflector unit which is particularly simple to mount may be provided. In particular, as a result, a particularly advantageously simple coupling may be achieved. Preferably, the wind deflector unit may be clipped easily by an operator onto the wiper arm or a windshield wiper fluid duct may be clipped onto the wind deflector unit. In particular, as a result, a simple and rapid retrofitting of a wind deflector unit on a wiper arm may be achieved.

It is further proposed that the at least one first coupling unit and the at least one second coupling unit in each case have a receiving region which are connected together. "Receiving region" is intended to be understood in this context, in particular, as a region which is provided for receiving a component to be coupled. Preferably, the receiving region, in particular, has a recess which has a cross-sectional shape which corresponds at least approximately to a cross-sectional shape of a component to be received in a received region. Particularly preferably, the recess in at least one plane, viewed from a central point of the recess within the planes, is surrounded by walls of the coupling unit in an angular range of at least 90°, preferably of at least 180° and particularly preferably of at least 270°. In this case "corresponding at least approximately" in this context is intended to be understood, in particular, that at least 40%, preferably at least 60% and particularly preferably a maximum of 80% of a surface of a cross-sectional shape relative to a surface of the at least approximately corresponding cross-sectional shape are congruent. Moreover, in this context "connected" is intended to be understood, in particular, that the receiving regions adjoin one another directly at least in one region. Preferably, it is intended to be understood thereby, in particular, that the receiving regions adjoin one another directly in at least one region without separation. As a result, a particularly advantageous and reliable coupling of the wind deflector unit to the wiper arm and the windshield wiper fluid duct may be achieved. In particular, as a result, a particularly simple and intuitive mounting may be implemented. Moreover, as a result, an advantageous use of space may be achieved.

Moreover, it is proposed that the receiving regions of the at least one first coupling unit and the at least one second coupling unit have a common opening region. "Opening region" is intended to be understood in this context, in particular, as a region, preferably a region which does not consist of material and which preferably adjoins at least one receiving region and via which the at least one adjoining receiving region is connected directly to the surroundings of the wind deflector unit. Preferably, a region is intended to be understood thereby via which the at least one adjoining receiving region in a plane perpendicular to a main direction of extent of the receiving region and/or the wind deflector unit is directly connected to the surroundings of the wind deflector unit. Particularly preferably, intended to be understood thereby in particular is a region in which the at least one adjoining receiving region, viewed in a plane perpendicular to a main direction of extent of the receiving region and/or the wind deflector unit, is not limited by a material body of the at least one first coupling unit and/or the at least one second coupling unit. In this case "main direction of extent" is intended to be understood as a sub-assembly and/or a region, in particular a direction, which extends parallel to a longest side edge of a smallest geometric cuboid, which only just completely encloses the sub-assembly and/or the region. As a result, a particularly advantageously simple mounting may be achieved. In particular, as a result, a coupling may be carried out by the coupling units via only one opening region.

Moreover, it is proposed that the at least one first coupling unit has a first receiving region with a first opening region and that the at least one second coupling unit has a second receiving region with a second opening region differing from the first opening region. As a result, a particularly advantageously simple mounting may be achieved. In particular, a separate coupling and uncoupling may be carried out as a result by the coupling units.

It is further proposed that the first opening region is arranged on a side of the first receiving region remote from the second receiving region and in that the second opening region is arranged on a side of the second receiving region remote from the first receiving region. As a result, a particularly advantageously simple mounting may be achieved. In particular, as a result, a clear separation of the opening regions may be achieved whereby an intuitive mounting may be achieved.

Advantageously, the wind deflector element forms a hollow space which, viewed in a main direction of extent, extends over at least a large proportion of a length of the wind deflector element. "At least a large proportion" is intended in this context to be understood, in particular, as at least 50%, preferably at least 70%, and particularly preferably at least 90% of the whole. As a result, an advantageously low weight of the wind deflector unit may be achieved with an advantageously high degree of stability.

The wind deflector unit according to the invention in this case is not intended to be limited to the above-described use and embodiment. In particular, for fulfilling a mode of operation described herein the wind deflector unit according to the invention may have a different number of individual elements, components and units from a number cited herein.

BRIEF DESCRIPTION OF THE DRAWINGS

Further advantages are disclosed from the following description of the drawings. In the drawings, six exemplary embodiments of the invention are shown. The drawings, the description and the claims contain numerous features in combination. The person skilled in the art will also expediently consider the features individually and combine them to form further meaningful combinations.

In the drawings.

DETAILED DESCRIPTION

Figure 1:
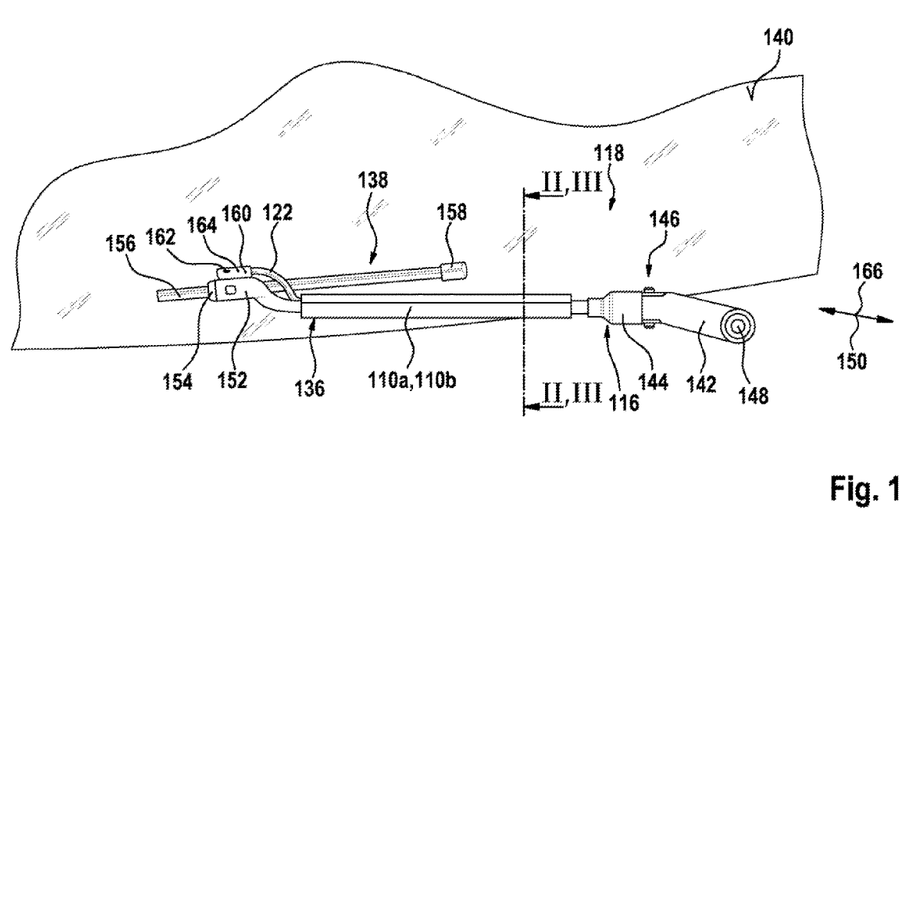
FIG. 1 shows a wiper arm device comprising a wind deflector unit according to the invention and comprising a wiper nozzle unit, a wiper arm and a partial detail of a wiper blade in a schematic view.

FIG. 1 shows a wiper arm device 136 comprising a wind deflector unit 110a, 110b according to the invention, a wiper arm 118 and a wiper blade 138. Moreover, FIG. 1 shows a surface 140 to be washed of a motor vehicle, not visible further. The surface 140 to be washed is formed by a windshield.

The wiper arm 118 has a wiper stem 116. The wiper stem 116 has two wiper arm segments 142, 144 and a hinge 146. The wiper arm segments 142, 144 are connected via the hinge 146. Moreover, a spring element, not visible further, is arranged in the region of the hinge 146. The spring element, not visible further, is provided to press the second wiper arm segment 144 in the direction of the surface 140 to be washed in a contact region of the second wiper arm segment 144. The surface 140 to be washed is formed by a motor vehicle windshield. The first wiper arm segment 142 is connected via a shaft 148 to the motor vehicle, not visible further. The shaft 148, viewed in a main direction of extent 150 of the wiper arm 118, is connected to the wiper stem 116 on an outer end of the wiper arm 118. The shaft 148 is driven by a drive motor, not visible further. A wiper arm adapter 152 is arranged at an end of the second wiper arm segment 144 remote from the hinge 146. The wiper arm adapter 152 is configured integrally with the second wiper arm segment 144. The wiper arm adapter 152 is provided for receiving a wiper blade adapter 154 of the wiper blade 138. The wiper arm adapter 152 receives the wiper blade adapter 154.

The wiper blade 138 comprises the wiper blade adapter 154. The wiper blade 138 comprises the wiper blade adapter 154 for coupling to the wiper arm 118. Moreover, the wiper blade 138 has a wiper blade wind deflector unit 156, two spring rails, not visible further, a wiper lip, not visible further, and two end caps 158, only one thereof being visible. The wiper blade 138 wipes in an operating mode over the surface 140 to be washed. The wiper lip, not visible further, of the wiper blade 138 is provided, during a wiping operating mode, to bear against the surface 140 to be washed and to wipe over said surface. The wiper lip, not visible further, is held via the spring rails, not visible further, in the wiper blade wind deflector unit 156.

The wiper arm device 136 has a windshield wiper fluid duct 122. The windshield wiper fluid duct 122 is provided to conduct windshield wiper fluid along the wiper arm 118. The windshield wiper fluid duct 122 is formed by a tube. Moreover, the windshield wiper fluid duct 122 is configured to be substantially hollow cylindrical.

Moreover, the wiper arm device 136 has a wiper nozzle unit 160. The wiper nozzle unit 160 has a wiper nozzle element 162. The wiper nozzle element 162 is formed by a nozzle. Moreover, the wiper nozzle element 162 is provided for applying windshield wiper fluid onto the surface 140 to be washed. The wiper nozzle element 162 is provided for applying windshield wiper fluid onto the windshield. The wiper nozzle element 162 is integrated in a base body 164 of the wiper nozzle unit 160. The wiper nozzle element 162 is connected, in a manner not visible further, to a connector, not visible further, for the windshield wiper fluid duct 122. Moreover, the wiper nozzle unit 160 has a coupling unit, not visible further. The coupling unit, not visible further, of the wiper nozzle unit 160 is provided to be connected to the wiper arm adapter 152 of the wiper arm 118 in a mounted state. The coupling unit, not visible further, of the wiper nozzle unit 160 is coupled to the wiper arm adapter 152, in a manner not visible further.

The windshield wiper fluid duct 122 is connected to the wiper nozzle unit 160 via the connector, not visible further. On an end of the windshield wiper fluid duct 122 remote from the wiper nozzle unit 160, the windshield wiper fluid duct 122, not visible further, is connected to a windshield wiper fluid supply, not visible further.

Figure 2:
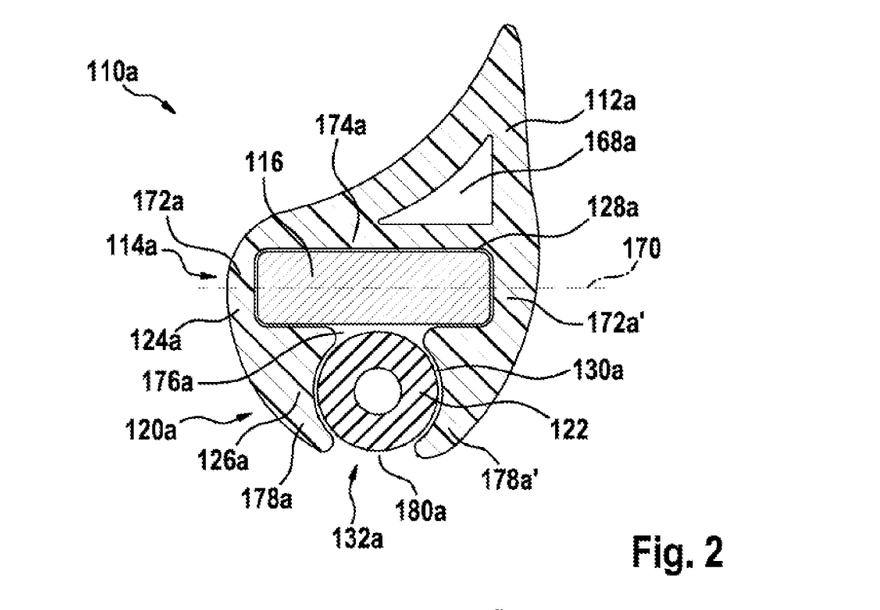
FIG. 2 shows the wind deflector unit according to the invention comprising a wind deflector element in a mounted state in a schematic sectional view along the cutting line II.

FIG. 2 shows the wind deflector unit 110a of the wiper arm device 136 comprising a wind deflector element 112a in a mounted state. The wiper arm device 136 comprises the wind deflector unit 110a. The wind deflector unit 110a has a main direction of extent 166 which in a mounted state corresponds to a main direction of extent 150 of the wiper arm 118. The wind deflector unit 110a is formed by a wiper arm wind deflector unit. The wind deflector unit 110a comprises the wind deflector element 112a. The wind deflector element 112a extends, viewed in the main direction of extent 166 of the wind deflector unit 110a, over the entire length of the wind deflector unit 110a. The wind deflector element 112a, viewed in a plane perpendicular to the main direction of extent 166 of the wind deflector unit 110a, is configured to be approximately triangular. An enlarged outer face of the wind deflector element 112a in this plane is curved in a concave manner. A second outer face of the wind deflector element 112a in this plane is curved in a convex manner. Moreover, the wind deflector element 112a forms a hollow space 168a. The hollow space 168a of the wind deflector element 112a, viewed in the main direction of extent 166 of the wind deflector unit 110a, extends over the entire length of the wind deflector element 112a. The hollow space 168a, viewed in a plane perpendicular to the main direction of extent 166 of the wind deflector unit 110a, has an outer contour which corresponds approximately to an outer contour of the wind deflector element 112a at a reduced scale. The outer contour of the hollow space 168a is similar to the outer contour of the wind deflector element 112a, viewed in a plane perpendicular to the main direction of extent 166 of the wind deflector unit 110a.

Moreover, the wind deflector unit 110a comprises a first coupling unit 114a. The first coupling unit 114a in a mounted state of the wind deflector unit 110a is provided to be connected to the wiper stem 116 of the wiper arm 118. The first coupling unit 114a is provided to be connected to the second wiper arm segment 144 of the wiper stem 116. The first coupling unit 114a is provided to connect the wind deflector unit 110a to the wiper stem 116 of the wiper arm 118. The first coupling unit 114a directly adjoins the wind deflector element 112a. The first coupling unit 114a adjoins the wind deflector element 112a in a direction perpendicular to a main extension plane 170 of the wiper stem 116 and perpendicular to a main direction of extent 166 of the wind deflector unit 110a. Moreover, the first coupling unit 114a comprises a clip fastening element 124a. The clip fastening element 124a has two fastening webs 172a, 172a'. The fastening webs 172a, 172a' in each case are partially formed by latching elements. The fastening webs 172a, 172a', viewed in a plane perpendicular to the main direction of extent 166 of the wind deflector unit 110a, have in each case an L-shaped cross-sectional shape, wherein the two fastening webs 172a, 172a' are mirror-symmetrical relative to one another. The freestanding ends of the L-shaped fastening webs 172a, 172a' in each case face one another. The sides of the fastening webs 172a, 172a' extend parallel to one another. The two fastening webs 172a, 172a' are connected together at the ends of the two sides remote from the freestanding ends, via a bottom side 174a of the clip fastening element 124a of the first coupling unit 114a. The bottom side 174a of the first coupling unit 114a directly adjoins the wind deflector element 112a.

The first coupling unit 114a has, moreover, a receiving region 128a. The receiving region 128a is provided for receiving the wiper stem 116 of the wiper arm 118. The receiving region 128a is provided for receiving the second wiper arm segment 144 of the wiper stem 116. The receiving region 128a, viewed in a plane perpendicular to the main direction of extent 166 of the wind deflector unit 110a, has a cross-sectional shape which corresponds approximately to a cross-sectional shape of the wiper stem 116. The receiving region 128a extends in the main direction of extent 166 of the wind deflector unit 110a over the entire length of the wind deflector unit 110a. The receiving region 128a extends parallel to the main direction of extent 166 of the wind deflector unit 110a. The receiving region 128a, viewed in a plane perpendicular to the main direction of extent 166 of the wind deflector unit 110a, is defined on four sides by the clip fastening element 124a of the first coupling unit 114a. The receiving region 128a is defined in one direction by the bottom side 174a of the clip fastening element 124a. In three further directions the receiving region 128a is defined by the two fastening webs 172a, 172a', wherein a gap 176a is arranged between the freestanding ends of the two fastening webs 172a, 172a'. Via the gap 176a, the wiper stem 116 of the wiper arm 118 is moved into the receiving region 128a. In this case, the two fastening webs 172a, 172a' are deflected resiliently outward by pressure, so that the gap 176a is enlarged and the wiper stem 116 may be pushed through the gap 176a.

Moreover, the wind deflector unit 110a has a second coupling unit 120a. The second coupling unit 120a, in a mounted state of the wind deflector unit 110a, is provided to receive the windshield wiper fluid duct 122. The second coupling unit 120a is provided to receive a windshield wiper fluid duct 122 of the wiper arm device 136. The second coupling unit 120a is provided to connect the wind deflector unit 110a to the windshield wiper fluid duct 122. The second coupling unit 120a adjoins the first coupling unit 114a on a side remote from the wind deflector element 112a. Moreover, the second coupling unit 120a has a clip fastening element 126a. The second coupling unit 120a, relative to a main plane of extent 170 of the wiper stem 116, is arranged on a side of the first coupling unit 114a opposing the wind deflector unit 112a. The clip fastening element 126a consists of two fastening webs 178a, 178a'. The fastening webs 178a, 178a' are in each case partially formed by latching elements. The fastening webs 178a, 178a', viewed in a plane perpendicular to the main direction of extent 166 of the wind deflector unit 110a, have in each case a partially C-shaped cross-sectional shape, wherein the two fastening webs 178a, 178a' are mirror-symmetrical relative to one another. The two fastening webs 178a, 178a' of the second coupling unit 120a at one end of the two fastening webs 172a, 172a' of the first coupling unit 114a, remote from the bottom side 174a of the first coupling unit 114a, directly adjoin the two fastening webs 172a, 172a' of the first coupling unit 114a.

The second coupling unit 120a has, moreover, a receiving region 130a. The receiving region 130a is provided for receiving the windshield wiper fluid duct 122. The receiving region 130a, viewed in a plane perpendicular to the main direction of extent 166 of the wind deflector unit 110a, has a cross-sectional shape which approximately corresponds to a cross-sectional shape of the windshield wiper fluid duct 122. The receiving region 130a extends in the main direction of extent 166 of the wind deflector unit 110a over the entire length of the wind deflector unit 110a. The receiving region 130a extends parallel to the main direction of extent 166 of the wind deflector unit 110a. The receiving region 130a, viewed in a plane perpendicular to the main direction of extent 166 of the wind deflector unit 110a, is defined to a large extent by the fastening webs 178a, 178a' of the second coupling unit 120a and by the fastening webs 172a, 172a' of the first coupling unit 114a. The gap 176a between the fastening webs 172a, 172a' of the first coupling unit 114a adjoins directly the receiving region 130a. On a side of the receiving region 130a remote from the gap 176a of the first coupling unit 114a, a gap 180a is located between the two fastening webs 178a, 178a' of the second coupling unit 120a. Via the gap 180a of the second coupling unit 120a, firstly the wiper stem 116 of the wiper arm 118 via the receiving region 130a of the second coupling unit 120a and via the gap 176a of the first coupling unit 114a is moved into the receiving region 128a of the first coupling unit 114a. Secondly, via the gap 180a of the second coupling unit 120a the windshield wiper fluid duct 122 is moved into the receiving region 130a of the second coupling unit 114a. In this case, the two fastening webs 178a, 178a' are deflected resiliently outward by pressure so that the gap 180a is enlarged and the wiper stem 116 or the windshield wiper fluid duct 122 may be pushed through the gap 180a.

The first coupling unit 114a and the second coupling unit 120a in each case have a clip fastening element 124a, 126a. The clip fastening elements 124a, 126a are configured integrally. Moreover, the first coupling unit 114a and the second coupling unit 120a in each case have a receiving region 128a, 130a. The receiving regions 128a, 130a of the first coupling unit 114a and the second coupling unit 120a in each case are connected together. The receiving regions 128a, 130a of the first coupling unit 114a and the second coupling unit 120a are in each case directly connected together via the gap 176a of the first coupling unit 114a. The receiving regions 128a, 130a of the first coupling unit 114a and the second coupling unit 120a also have a common opening region 132a. Both receiving regions 128a, 130a, viewed in a plane perpendicular to the main direction of extent 166 of the wind deflector unit 110a, are connected to the surroundings via the gap 180a of the second coupling unit 120a and thus have a common opening region 132a.

Moreover, the wind deflector element 112a is integrally configured with the first coupling unit 114a and with the second coupling unit 120a. The wind deflector element 112a, the first coupling unit 114a and the second coupling unit 120a are configured in one piece. The wind deflector element 112a, the first coupling unit 114a and the second coupling unit 120a consist of the same material. The entire wind deflector unit 110a is produced in an extrusion process.

Moreover, the wind deflector unit 110a preferably has a locking element, not visible further. The locking element is provided for securing the wind deflector unit 110a on the wiper stem 116 of the wiper arm 118. The locking element is provided to prevent inadvertent release of the wiper stem 116 of the wiper arm 118 from the first coupling unit 114a. Moreover, the locking element is provided for securing the windshield wiper fluid duct 122 on the wind deflector unit 110a. The locking element is provided to prevent inadvertent release of the windshield wiper fluid duct 122 from the second coupling unit 120a. Different embodiments of the locking element which appear expedient to the person skilled in the art are conceivable.

Figure 3:
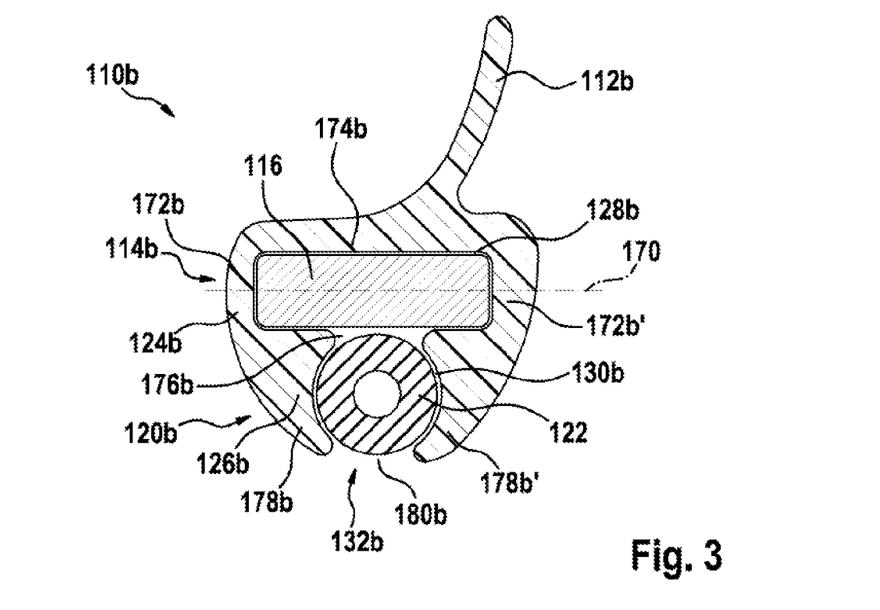
FIG. 3 shows the wind deflector unit according to the invention comprising an alternative wind deflector element in a mounted state in a schematic sectional view along the cutting line III.

FIG. 1 shows a first type of exemplary embodiment, wherein FIG. 2 shows a first exemplary embodiment of the first type. FIG. 3 shows a second exemplary embodiment of the first type, with an alternative embodiment of the wind deflector element of the wind deflector unit according to the invention, relative to FIG. 2. For differentiating the exemplary embodiments of the first type, the letter a is placed after the reference numerals of the first exemplary embodiment in FIG. 2 which relate to the wind deflector unit. In the second exemplary embodiment in FIG. 3 the letter a is replaced by the letter b.

FIG. 3 shows a wind deflector unit 110b according to the invention with an alternative wind deflector element 112b in a mounted state. The wind deflector unit 110b has the wind deflector element 112b. The wind deflector element 112b, viewed in a main direction of extent 166 of the wind deflector unit 110b, extends over the entire length of the wind deflector unit 110b. The wind deflector element 112b is formed by a curved wall. The wind deflector element 112b, viewed in a plane perpendicular to the main direction of extent 166 of the wind deflector unit 110b, has a preferably uniform wall thickness. Moreover, the wind deflector element 112b, viewed in the plane perpendicular to the main direction of extent 166 of the wind deflector unit 110b, is curved in a concave-convex manner. A front face of the wind deflector element 112b is therefore curved in a concave manner and a rear face is curved in a convex manner. Moreover, the wind deflector element 112b, viewed in a plane perpendicular to the main direction of extent 166 of the wind deflector unit 110b, is deflected relative to a main direction of extent 170 of a wiper stem 116.

In FIGS. 4 to 9 two further types of exemplary embodiment of the invention are shown. The following descriptions and drawings are substantially limited to the differences between the exemplary embodiments and/or between the types of exemplary embodiments, wherein relative to components denoted the same, in particular with reference to components with the same reference numerals, in principle reference may also be made to the drawings and/or the description of other exemplary embodiments and/or other types of exemplary embodiments, in particular of FIGS. 1 to 3. To differentiate between the types of exemplary embodiments, the numeral 1 is placed before the first type of exemplary embodiment in FIGS. 1 to 3. In the type of exemplary embodiment of FIGS. 4 to 9, the numeral 1 is replaced by the numerals 2 and 3.

Figure 4:
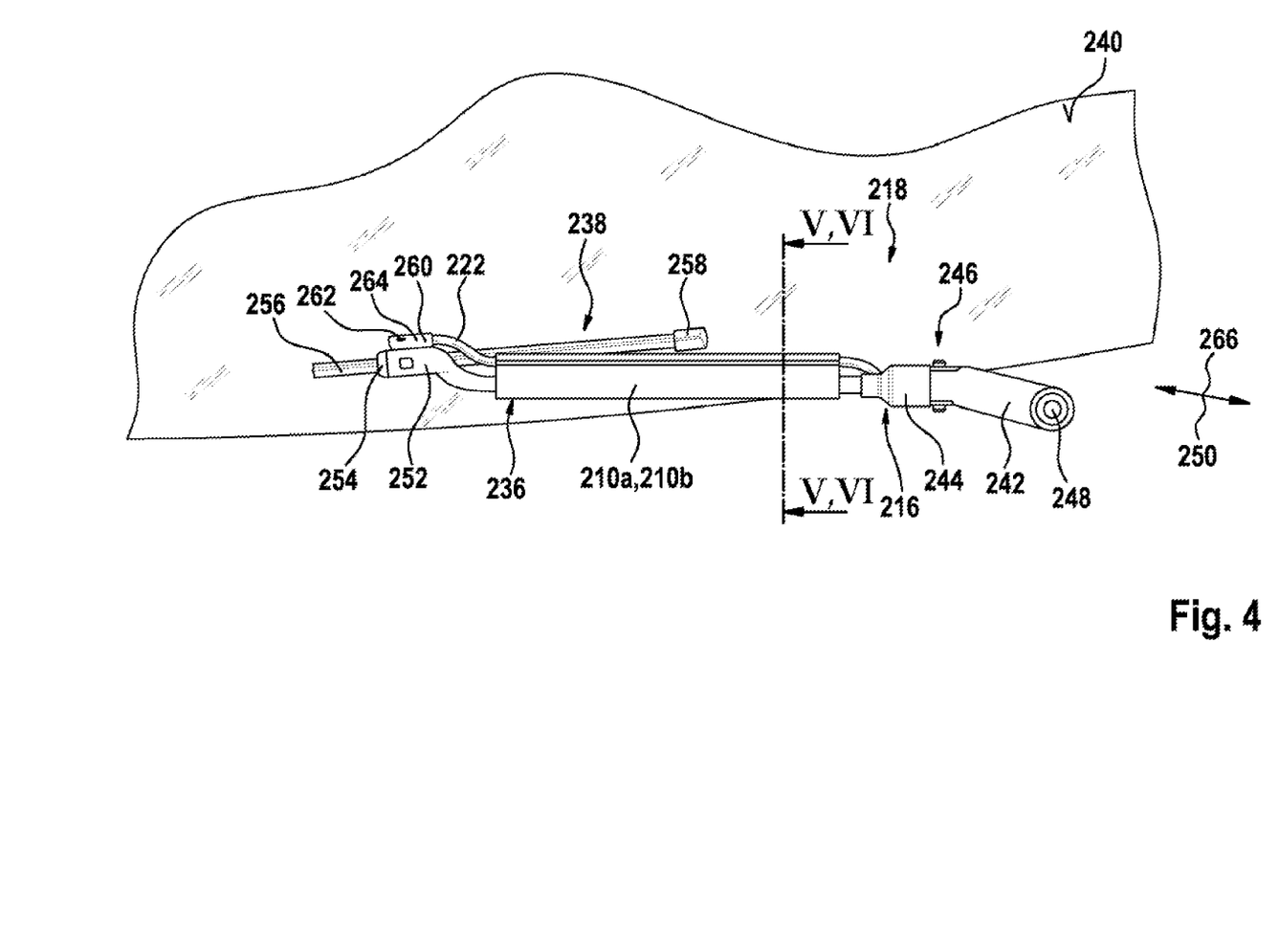
FIG. 4 shows an alternative wiper arm device comprising an alternative wind deflector unit according to the invention and comprising a wiper nozzle unit, a wiper arm and a partial detail of a wiper blade in a schematic view.

FIG. 4 shows a wiper arm device 236 with a wind deflector unit 210a, 210b according to the invention, a wiper arm 218 and a wiper blade 238.

Figure 5:
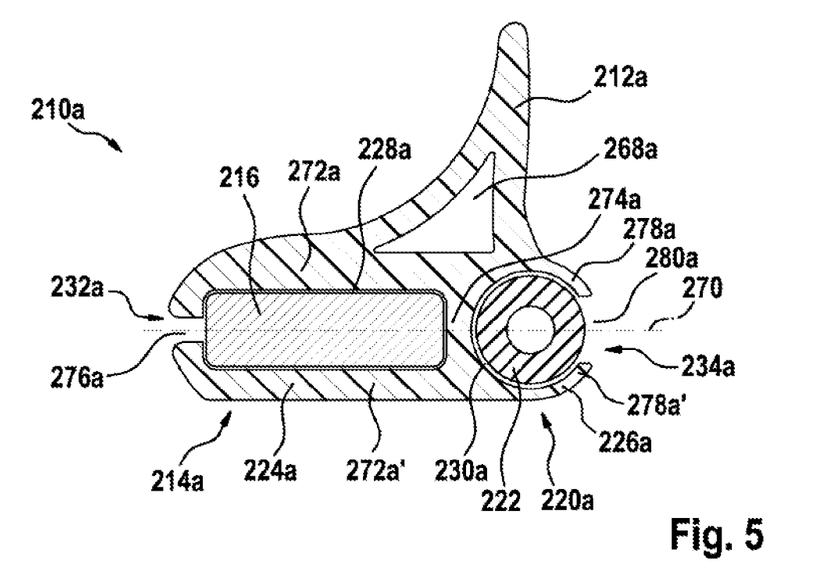
FIG. 5 shows the alternative wind deflector unit according to the invention comprising a wind deflector element in a mounted state in a schematic sectional view along the cutting line V.

FIG. 5 shows the wind deflector unit 210a of the wiper arm device 236 with a wind deflector element 212a in a mounted state. The wiper arm device 236 has the wind deflector unit 210a. The wind deflector unit 210a is formed by a wiper arm wind deflector unit. The wind deflector unit 210a has a wind deflector element 212a. The wind deflector element 212a, viewed in the main direction of extent 266 of the wind deflector unit 210a, extends over the entire length of the wind deflector unit 210a. The wind deflector element 212a, viewed in a plane perpendicular to the main direction of extent 266 of the wind deflector unit 210a, is of approximately triangular configuration. An enlarged outer face of the wind deflector element 212a in this plane is curved in a concave manner. A second outer face of the wind deflector element 212a in this plane is curved in a convex manner. Moreover, the wind deflector element 212a forms a hollow space 268a. The hollow space 268a of the wind deflector element 212a, viewed in the main direction of extent 266 of the wind deflector unit 210a, extends over the entire length of the wind deflector element 212a. The hollow space 268a, viewed in a plane perpendicular to the main direction of extent 266 of the wind deflector unit 210a, has an outer contour which approximately corresponds to an outer contour of the wind deflector element 212a at a reduced scale. The outer contour of the hollow space 268a, viewed in a plane perpendicular to the main direction of extent 266 of the wind deflector unit 210a, is similar to the outer contour of the wind deflector element 212a.

Moreover, the wind deflector unit 210a has a first coupling unit 214a. The first coupling unit 214a adjoins directly the wind deflector element 212a. The first coupling unit 214a adjoins the wind deflector element 212a in a direction perpendicular to a main extension plane 270 of a wiper stem 216 and perpendicular to a main direction of extent 266 of the wind deflector unit 210a. Moreover, the first coupling unit 214a has a clip fastening element 224a. The clip fastening element 224a has two fastening webs 272a, 272a'. The fastening webs 272a, 272a' in each case are partially formed by latching elements. The fastening webs 272a, 272a', viewed in a plane perpendicular to the main direction of extent 266 of the wind deflector unit 210a, have in each case an L-shaped cross-sectional shape, wherein the two fastening webs 272a, 272a' are mirror-symmetrical relative to one another. The freestanding ends of the L-shaped fastening webs 272a, 272a' face one another in each case. The sides of the fastening webs 272a, 272a' extend parallel to one another. The two fastening webs 272a, 272a' are connected together at the ends remote from the freestanding ends, via a bottom side 274a of the clip fastening element 224a of the first coupling unit 214a. The bottom side 274a extends perpendicular to the main extension plane 270 of the wiper stem 216. The first fastening web 272a of the first coupling unit 214a adjoins directly the wind deflector element 212a and extends substantially parallel to the main extension plane 270 of the wiper stem 216.

The first coupling unit 214a also has a first receiving region 228a. The first receiving region 228a, viewed in a plane perpendicular to the main direction of extent 266 of the wind deflector unit 210a, is defined on four sides by the clip fastening element 224a of the first coupling unit 214a. The first receiving region 228a is defined in one direction by the bottom side 274a of the clip fastening element 224a. In three further directions, the first receiving region 228a is defined by the two fastening webs 272a, 272a', wherein a gap 276a is arranged between the two freestanding ends of the two fastening webs 272a, 272a'. Via the gap 276a, the wiper stem 216 of the wiper arm 218 is moved into the first receiving region 228a. The gap 276a forms a first opening region 232a of the first receiving region 228a. In a plane viewed perpendicular to the main direction of extent 266 of the wind deflector unit 210a, the gap 276a, viewed from a central point of the first receiving region 228a, is arranged in a direction parallel to the main extension plane 270 of the wiper stem 216 from the receiving region 228a.

Moreover, the wind deflector unit 210a has a second coupling unit 220a. The second coupling unit 220a directly adjoins the wind deflector element 212a in a direction perpendicular to a main extension plane 270 of the wiper stem 216 and perpendicular to a main direction of extent 266 of the wind deflector unit 210a. Moreover, the second coupling unit 220a directly adjoins the first coupling unit 214a in a direction parallel to a main extension plane 270 of the wiper stem 216 and perpendicular to a main direction of extent 266 of the wind deflector unit 210a. The second coupling unit 220a, viewed in a plane perpendicular to the main direction of extent 266 of the wind deflector unit 210a, is arranged on a side of the first coupling unit 214a facing the gap 276a of the first coupling unit 214a. Moreover, the second coupling unit 220a has a clip fastening element 226a. The clip fastening element 226a has two fastening webs 278a, 278a'. The fastening webs 278a, 278a' in each case are formed partially from latching elements. The fastening webs 278a, 278a', viewed in a plane perpendicular to the main direction of extent 266 of the wind deflector unit 210a, have in each case a partially C-shaped cross-sectional shape, wherein the two fastening webs 278a, 278a' are mirror-symmetrical relative to one another. The fastening webs 278a, 278a' of the second coupling unit 220a, viewed in a plane perpendicular to the main direction of extent 266 of the wind deflector unit 210a, are connected together on a side facing the first coupling unit 214a, and thus form a partially circular inner contour. On a side remote from the first coupling unit 214a, the two fastening webs 278a, 278a' of the second coupling unit 220a form a gap 280a. The first fastening web 278a of the second coupling unit 220a directly adjoins the wind deflector element 212a.

The second coupling unit 220a, moreover, has a second receiving region 230a. The second receiving region 230a, viewed in a plane perpendicular to the main direction of extent 266 of the wind deflector unit 210a, is to a large extent defined by the clip fastening element 226a of the second coupling unit 220a. The gap 280a between the fastening webs 278a, 278a' of the second coupling unit 220a forms a second opening region 234a of the second receiving region 230a.

As a result, the first coupling unit 214a has the first receiving region 228a with the first opening region 232a and the second coupling unit 220a has the second receiving region 230a with the second opening region 234a differing from the first opening region 232a. The first opening region 232a is arranged on a side of the first receiving region 228a remote from the second receiving region 230a. Moreover, the second opening region 234a is arranged on a side of the second receiving region 230a remote from the first receiving region 228a.

Moreover, the wind deflector unit 210a preferably has two locking elements, not visible further. The first locking element is provided for securing the wind deflector unit 210a on the wiper stem 216 of the wiper arm 218. The first locking element is provided to prevent inadvertent release of the wiper stem 216 of the wiper arm 218 from the first coupling unit 214a. The second locking element is provided for securing the windshield wiper fluid duct 222 on the wind deflector unit 210a. The second locking element is provided to prevent an inadvertent release of the windshield wiper fluid duct 222 from the second coupling unit 220a. Different embodiments of the locking elements which appear expedient to the person skilled in the art are conceivable.

Figure 6:
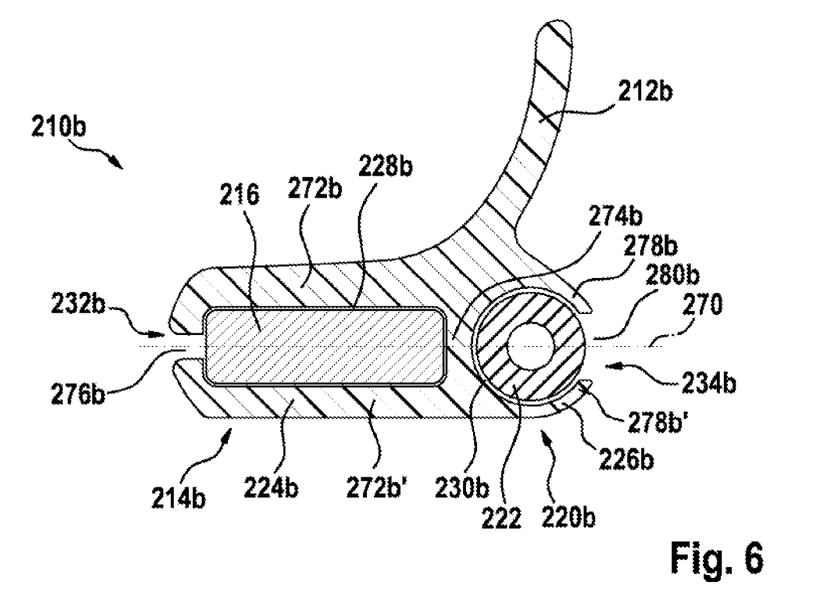
FIG. 6 shows the alternative wind deflector unit according to the invention comprising an alternative wind deflector element in a mounted state in a schematic sectional view along the cutting line VI.

FIG. 4 shows a second type of exemplary embodiment, wherein FIG. 5 shows a first exemplary embodiment of the second type. FIG. 6 shows a second exemplary embodiment of the second type, with an alternative design of wind deflector element of the wind deflector unit according to the invention, relative to FIG. 5. For differentiating between the exemplary embodiments of the second type the letter a is placed after the reference numerals of the first exemplary embodiment in FIG. 5 which refer to the wind deflector unit. In the second exemplary embodiment in FIG. 6, the letter a is replaced by the letter b.

FIG. 6 shows a wind deflector unit 210b according to the invention with an alternative wind deflector element 212b in a mounted state. The wind deflector unit 210b has the wind deflector element 212b. The wind deflector element 212b, viewed in a main direction of extent 266 of the wind deflector unit 210b, extends over the entire length of the wind deflector unit 210b. The wind deflector element 212b is formed by a curved wall. The wind deflector element 212b, viewed in a plane perpendicular to the main direction of extent 266 of the wind deflector unit 210b, has a preferably uniform wall thickness. Moreover, the wind deflector element 212b, viewed in the plane perpendicular to the main direction of extent 266 of the wind deflector unit 210b, is curved in a concave/convex manner. A front face of the wind deflector element 212b is, therefore, curved in a concave manner and a rear face is curved in a convex manner. Moreover, the wind deflector element 212b, viewed in a plane perpendicular to the main direction of extent 266 of the wind deflector unit 210b, is angled back relative to a main extension plane 270 of a wiper stem 216.

Figure 7:
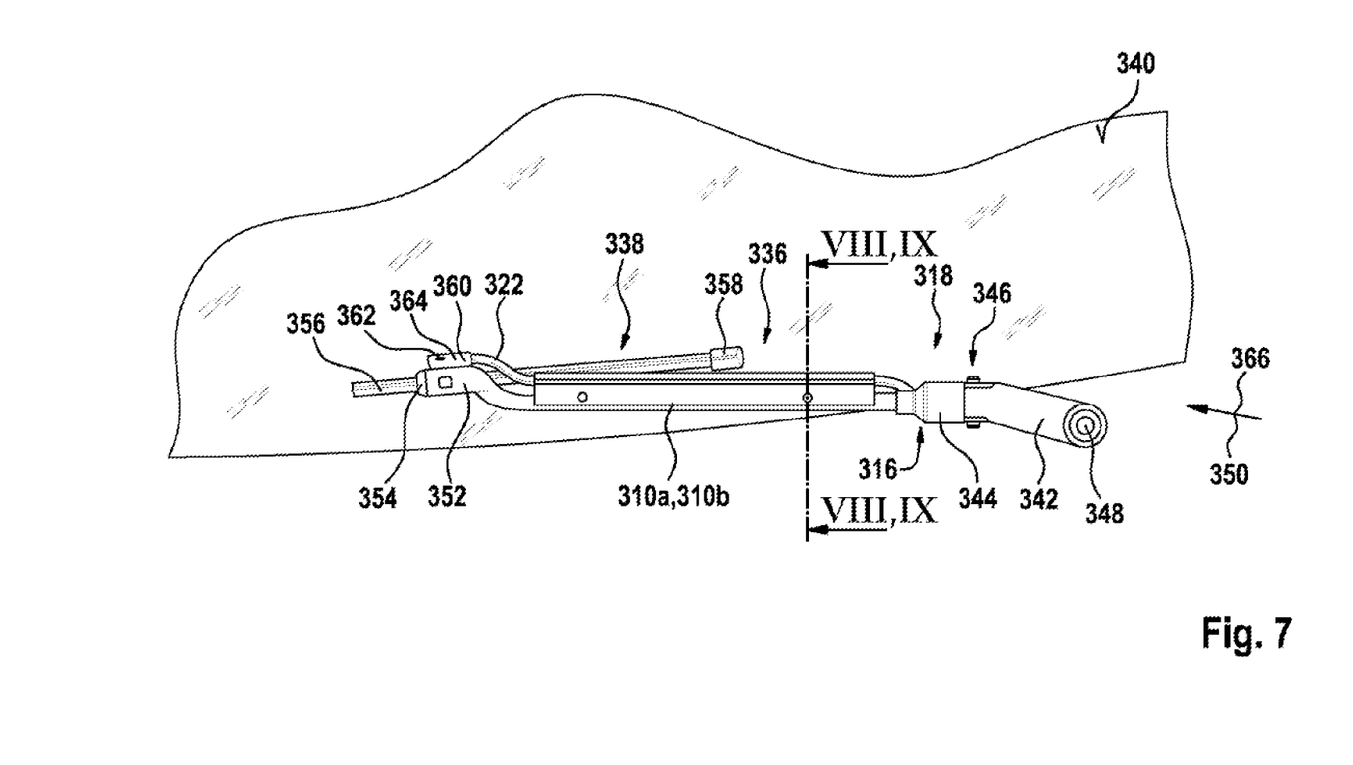
FIG. 7 shows a further alternative wiper arm device comprising a further alternative wind deflector unit according to the invention and comprising a wiper nozzle unit, a wiper arm and a partial detail of a wiper blade in a schematic view.

FIG. 7 shows a wiper arm device 336 comprising a wind deflector unit 310a, 310b according to the invention, a wiper arm 318 and a wiper blade 338. The wiper arm 318 has a wiper stem 316. The wiper stem 316 has two wiper arm segments 342, 344 and a hinge 346. The second wiper arm segment 344 has two recesses 382. The recesses 382 are formed by through-bores.

Figure 8:
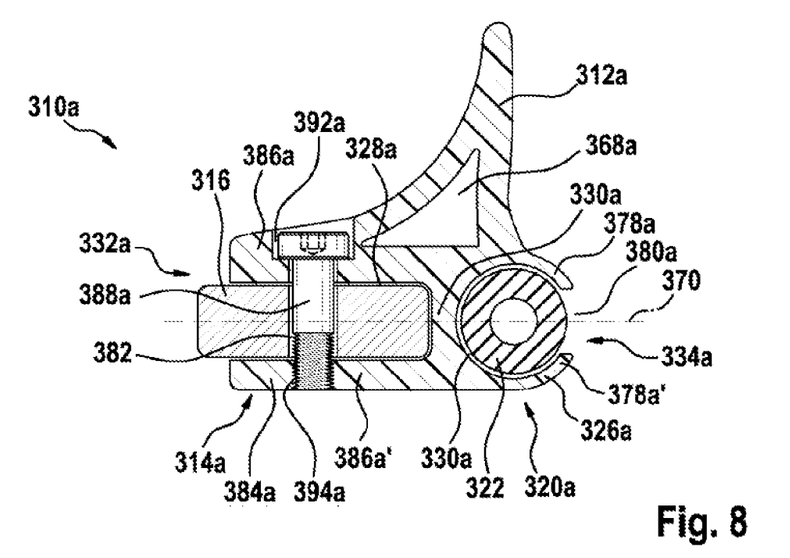
FIG. 8 shows the alternative wind deflector unit according to the invention comprising a wind deflector element in a mounted state in a schematic sectional view along the cutting line VIII and FIG. 9 shows the alternative wind deflector unit according to the invention comprising an alternative wind deflector element in a mounted state in a schematic sectional view along the cutting line IX.

FIG. 8 shows the wind deflector unit 310a of the wiper arm device 336 with a wind deflector element 312a in a mounted state. The wiper arm device 336 has the wind deflector unit 310a. The wind deflector unit 310a is formed by a wiper arm wind deflector unit. The wind deflector unit 310a has a wind deflector element 312a. The wind deflector element 312a, viewed in the main direction of extent 366 of the wind deflector unit 310a, extends over the entire length of the wind deflector unit 310a. The wind deflector element 312a, viewed in a plane perpendicular to the main direction of extent 266 of the wind deflector unit 310a, is of approximately triangular configuration. An enlarged outer face of the wind deflector element 312a is curved in this plane in a concave manner. A second outer face of the wind deflector element 312a is curved in this plane in a convex manner. Moreover, the wind deflector element 312a forms a hollow space 368a. The hollow space 368a of the wind deflector element 312a, viewed in the main direction of extent 366 of the wind deflector unit 310a, extends over the entire length of the wind deflector element 312a. The hollow space 368a, viewed in a plane perpendicular to the main direction of extent 366 of the wind deflector unit 310a, has an outer contour which approximately corresponds to an outer contour of the wind deflector element 312a at a reduced scale. The outer contour of the hollow space 368a, viewed in a plane perpendicular to the main direction of extent 366 of the wind deflector unit 310a, is similar to the outer contour of the wind deflector element 312a.

Moreover, the wind deflector unit 310a has a first coupling unit 314a. The first coupling unit 314a directly adjoins the wind deflector element 312a. The first coupling unit 314a adjoins the wind deflector element 312a in a direction perpendicular to a main extension plane 370 of the wiper stem 316, and perpendicular to a main direction of extent 366 of the wind deflector unit 310a. Moreover, the first coupling unit 314a has a screw fastening element 384a. The screw fastening element 384a has two fastening webs 386a, 386a' and two screws 388a. The fastening webs 386a, 386a' of the screw fastening element 384a, viewed in a plane perpendicular to the main direction of extent 366 of the wind deflector unit 310a, in each case extend parallel to a main extension plane 370 of the wiper stem 316. The two fastening webs 386a, 386a' extend parallel to one another. Moreover, the two fastening webs 386a, 386a' are connected together via a bottom side of the screw fastening element 384a of the first coupling unit 314a. The bottom side extends perpendicular to the main extension plane 370 of the wiper stem 316. The first fastening web 386a of the first coupling unit 314a directly adjoins the wind deflector element 312a and extends substantially parallel to the main extension plane 370 of the wiper stem 316. Moreover, the first fastening web 386a of the screw fastening element 384a has two recesses 392a. The recesses 392a are formed by through-bores. The second fastening web 386a' has at the same position, displaced perpendicular to the main extension plane 370 of the wiper stem 316, two threaded bores 394a. For fastening the first coupling unit 314a to the wiper stem 316, the screws 388a in each case may now be screwed through one respective recess 392a of the first fastening web 386a and through one respective recess 382 of the second wiper arm segment 344 of the wiper stem 316 into one respective threaded bore 394a of the second fastening web 386a'.

The first coupling unit 314a also has a first receiving region 328a. The first receiving region 328a, viewed in a plane perpendicular to the main direction of extent 366 of the wind deflector unit 310a, is defined on three sides by the screw fastening element 384a of the first coupling unit 314a. The first receiving region 328a is defined in one direction by the bottom side of the screw fastening element 384a. In two further directions, the first receiving region 328a is defined by the two fastening webs 386a, 386a'. The first receiving region 328a has an opening region 332a which faces in a direction parallel to the main extension plane 370 of the wiper stem 316 and perpendicular to the main direction of extent 366 of the wind deflector unit 310a.

Moreover, the wind deflector unit 310a has a second coupling unit 320a. The second coupling unit 320a has a second receiving region 330a.

As a result, the first coupling unit 314a has the first receiving region 328a with the first opening region 332a and the second coupling unit 320a has the second receiving region 330a with the second opening region 334a differing from the first opening region 332a. The first opening region 332a is arranged on a side of the first receiving region 328a remote from the second receiving region 330a. Moreover, the second opening region 334a is arranged on a side of the second receiving region 330a remote from the first receiving region 328a.

Moreover, the wind deflector unit 310a preferably has a locking element, not visible further. The locking element is provided for securing the windshield wiper fluid duct 322 on the wind deflector unit 310a. The locking element is provided to prevent an inadvertent release of the windshield wiper fluid duct 322 from the second coupling unit 320a. Different embodiments of the locking element which appear expedient to the person skilled in the art are also conceivable.

Figure 9:
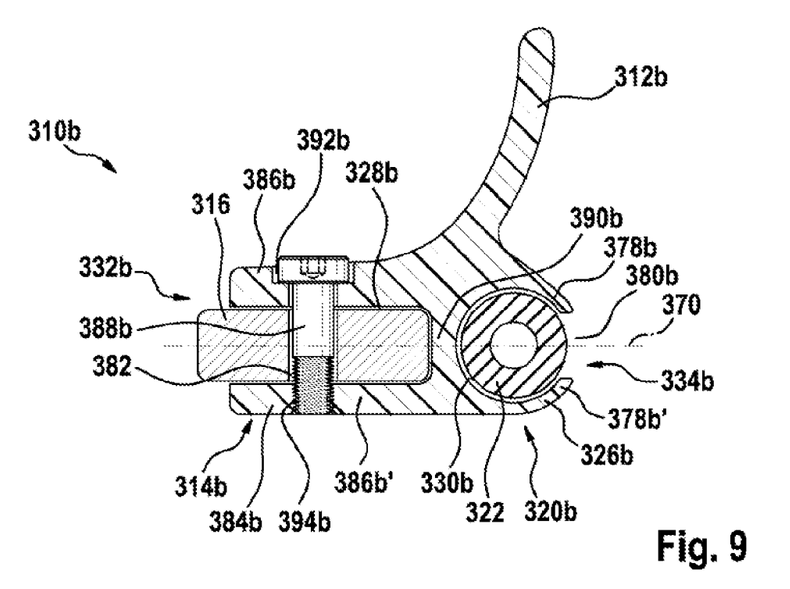

FIG. 7 shows a third type of exemplary embodiment, wherein FIG. 8 shows a first exemplary embodiment of the third type. FIG. 9 shows a second exemplary embodiment of the third type, with an alternative embodiment of the wind deflector element of the wind deflector unit according to the invention, relative to FIG. 8. To differentiate the exemplary embodiments of the third type, the letter a is placed after the reference numerals of the first exemplary embodiment in FIG. 8 which relate to the wind deflector unit. In the second exemplary embodiment in FIG. 9, the letter a is replaced by the letter b.

FIG. 9 shows a wind deflector unit 310b according to the invention with an alternative wind deflector element 312b in a mounted state. The wind deflector unit 310b has the wind deflector element 312b. The wind deflector element 312b, viewed in a main direction of extent 366 of the wind deflector unit 310b, extends over the entire length of the wind deflector unit 310b. The wind deflector element 312b is formed by a curved wall. The wind deflector element 312b, viewed in a plane perpendicular to the main direction of extent 366 of the wind deflector unit 310b, has a uniform wall thickness. Moreover, the wind deflector element 312b, viewed in a plane perpendicular to the main direction of extent 366 of the wind deflector unit 310b, is curved in a concave/convex manner. A front face of the wind deflector element 312b is, therefore, curved in a concave manner and a rear face is curved in a convex manner. Moreover, the wind deflector element 312b, viewed in a plane perpendicular to the main direction of extent 366 of the wind deflector unit 310b, is angled back relative to a main extension plane 370 of a wiper stem 316.

What is claimed is:

1. A wiper arm apparatus comprising a wiper stem (116) of a wiper arm, a windshield wiper fluid duct (122), and a wiper arm wind deflector unit, wherein the wiper arm wind deflector unit includes at least one wind deflector element (112a, 112b; 212a, 212b; 312a, 312b) including at least one first coupling unit (114a, 114b; 214a, 214b; 314a, 314b) which in a mounted state is configured to be connected to the wiper stem (116; 216; 316) of the wiper arm (118; 218; 318) and including at least one second coupling unit (120a, 120b; 220a, 220b; 320a, 320b) which in a mounted state is configured to receive the windshield wiper fluid duct (122; 222; 322), wherein the wind deflector element (112a, 112b) includes an opening (132a, 132b) along an exterior of the wind deflector element (112a, 112b) that opens into a single recessed cavity within the wind deflector element (112, 112b), wherein the single recessed cavity defines both a first receiving region (128a, 128b) in the first coupling unit (114a, 114b) to hold the wiper stem (116) and a second receiving region (130a, 130b) in the second coupling unit (120a, 120b) to hold the wiper fluid duct (122), wherein the opening (132a, 132b) opens directly into only the second receiving region (130a, 130b), such that the second receiving region (130a, 130b) is disposed between the opening (132a, 132b) and the first receiving region (128a, 128b), wherein the at least one first coupling unit (114a, 114b; 214a, 214b; 314a, 314b) is coupled to the wiper stem (116; 216; 316) of the wiper arm (118; 218; 318) and the at least one second coupling unit (120a, 120b; 220a, 220b; 320a, 320b) is coupled to the windshield wiper fluid duct (122; 222; 322), and wherein the wiper arm is configured to be coupled to a wiper blade.

2. The wiper arm apparatus of claim 1, characterized in that the at least one wind deflector element (112a, 112b; 212a, 212b; 312a, 312b) is integrally configured with the at least one first coupling unit (114a, 114b; 214a, 214b; 314a, 314b) and/or with the at least one second coupling unit (120a, 120b; 220a, 220b; 320a, 320b).

3. The wiper arm apparatus of claim 1, characterized in that the at least one first coupling unit (114a, 114b; 214a, 214b) and the at least one second coupling unit (120a, 120b; 220a, 220b) comprise at least one clip fastening element (124a, 126a, 124b, 126b; 224a, 226a, 224b, 226b).

4. The wiper arm apparatus of claim 1, characterized in that the at least one first coupling unit (314a, 314b) or the at least one second coupling unit (320a, 320b) comprises at least one clip fastening element (326a, 326b).

5. A method for producing a wiper arm apparatus as claimed in claim 1, characterized in that the wind deflector unit (110a, 110b; 210a, 210b; 310a, 310b) is at least partially produced in an extrusion process.

6. The wiper arm apparatus of claim 1, wherein the wiper stem (116; 216; 316) is generally rectangular in cross-section and includes a lower, flat surface that extends from a first side to a second, opposite side of the wiper stem (116; 216; 316), wherein the windshield wiper fluid duct (122; 222; 322) is generally circular in cross-section, wherein a radius of the circular cross-section of the wiper stem (116; 216; 316) extends perpendicular to the lower, flat surface at a central location on the lower, flat surface between the first and second ends, and wherein the first receiving region (128*a*, 128*b*) has a generally rectangular shape and the second receiving region (130*a*, 130*b*) has a generally circular shape.

7. The wiper arm apparatus of claim 1, wherein the first receiving region (128*a*, 128*b*) has a generally rectangular shape and the second receiving region (130*a*, 130*b*) has a generally circular shape.

8. The wiper arm apparatus of claim 1, wherein a main extension plane (170) extends through the first receiving region (128*a*, 128*b*) but not the second receiving region (130*a*, 130*b*), wherein the first receiving region (128*a*, 128*b*) is disposed directly above the second receiving region (130*a*, 130*b*) along an axis that is perpendicular to the main extension plane (170), and wherein the axis extends through the opening (132*a*, 132*b*), the second receiving region (130*a*, 130*b*), and the first receiving region (128*a*, 128*b*).

* * * * *